United States Patent
Wei et al.

(10) Patent No.: US 9,264,819 B2
(45) Date of Patent: Feb. 16, 2016

(54) THERMOACOUSTIC DEVICE

(71) Applicants: Tsinghua University, Beijing (CN); HON HAI PRECISION INDUSTRY CO., LTD., New Taipei (TW)

(72) Inventors: Yang Wei, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 13/930,459

(22) Filed: Jun. 28, 2013

(65) Prior Publication Data

US 2014/0140547 A1    May 22, 2014

(30) Foreign Application Priority Data

Nov. 20, 2012    (CN) .......................... 2012 1 0471134

(51) Int. Cl.
*H04R 25/00* (2006.01)
*H04R 23/00* (2006.01)
*B82Y 30/00* (2011.01)

(52) U.S. Cl.
CPC .............. *H04R 23/002* (2013.01); *B82Y 30/00* (2013.01)

(58) Field of Classification Search
CPC ........... H04R 23/002; H04R 2201/028; H04R 2499/11; H04M 1/03; H04M 1/035
USPC ........... 381/164, 394; 379/433.02; 455/569.1, 455/575.1
See application file for complete search history.

(56) References Cited

U.S. PATENT DOCUMENTS

| | | | |
|---|---|---|---|
| 7,876,912 B2 | 1/2011 | Liu et al. | |
| 7,881,157 B2 * | 2/2011 | Watabe | B06B 1/02 367/140 |
| 8,059,841 B2 | 11/2011 | Jiang et al. | |
| 8,115,544 B2 * | 2/2012 | Trauth | H03F 1/30 330/307 |
| 8,208,661 B2 | 6/2012 | Jiang et al. | |
| 8,300,855 B2 | 10/2012 | Liu et al. | |
| 8,494,187 B2 | 7/2013 | Jiang et al. | |
| 8,553,912 B2 | 10/2013 | Wang et al. | |
| 2005/0201575 A1 | 9/2005 | Koshida et al. | |
| 2006/0043576 A1 | 3/2006 | Lee | |
| 2006/0233388 A1 | 10/2006 | Liow et al. | |
| 2008/0170727 A1 | 7/2008 | Bachman et al. | |
| 2009/0268563 A1 * | 10/2009 | Jiang | H04R 23/002 367/140 |
| 2010/0067714 A1 | 3/2010 | Cheng | |
| 2010/0086166 A1 | 4/2010 | Jiang et al. | |
| 2010/0166232 A1 * | 7/2010 | Liu | H04R 1/028 381/164 |
| 2010/0203929 A1 * | 8/2010 | Skagmo | B29C 45/14065 455/575.1 |

(Continued)

FOREIGN PATENT DOCUMENTS

| | | |
|---|---|---|
| CN | 101771920 | 7/2010 |
| CN | 102307715 | 1/2012 |

(Continued)

*Primary Examiner* — Curtis Kuntz
*Assistant Examiner* — Ryan Robinson
(74) *Attorney, Agent, or Firm* — Novak Druce Connolly Bove + Quigg LLP

(57) ABSTRACT

A thermoacoustic device includes a PCB substrate, a speaker installed on the PCB substrate and including a sound wave generator, and an IC chip installed on the PCB substrate. The speaker and the IC chip are electrically connected by the PCB substrate. The IC chip input an audio signal to the speaker. The speaker heats surrounding medium intermittently according to the input signal so that the surrounding medium to produce a sound by expansion and contraction.

18 Claims, 14 Drawing Sheets

(56) References Cited

U.S. PATENT DOCUMENTS

| | | |
|---|---|---|
| 2010/0260357 A1 | 10/2010 | Liu et al. |
| 2010/0311002 A1 | 12/2010 | Jiang et al. |
| 2011/0033069 A1 | 2/2011 | Liu et al. |
| 2011/0051961 A1 | 3/2011 | Jiang et al. |
| 2011/0054659 A1 | 3/2011 | Carlson et al. |
| 2012/0250905 A1 | 10/2012 | Jiang et al. |
| 2012/0250907 A1 | 10/2012 | Jiang et al. |
| 2012/0250908 A1* | 10/2012 | Jiang .................. H04R 23/002 381/164 |
| 2013/0129119 A1 | 5/2013 | Miyatake et al. |
| 2013/0216074 A1 | 8/2013 | Homare Kon |

FOREIGN PATENT DOCUMENTS

| | | |
|---|---|---|
| JP | 11-300274 | 11/1999 |
| JP | 2005-57479 | 3/2005 |
| JP | 2005-057495 | 3/2005 |
| JP | 3808493 | 5/2006 |
| JP | 2008-167252 | 7/2008 |
| JP | 2009-141880 | 6/2009 |
| JP | 2010-74831 | 4/2010 |
| JP | 2010-93804 | 4/2010 |
| JP | 2010-288270 | 12/2010 |
| JP | 2011-41269 | 2/2011 |
| JP | 2012-039272 | 2/2012 |
| JP | 2012-39272 | 2/2012 |
| JP | 2012-94942 | 5/2012 |
| JP | 2012-209923 | 10/2012 |
| TW | 209093 | 7/1993 |
| TW | I246735 | 1/2006 |
| TW | M299999 | 10/2006 |
| TW | 200644701 | 12/2006 |
| TW | I273715 | 2/2007 |
| TW | 200725861 | 7/2007 |
| TW | 200743677 | 12/2007 |
| TW | 201002097 | 1/2010 |
| TW | 201018256 | 5/2010 |
| TW | 201029481 | 8/2010 |
| TW | 201043763 | 12/2010 |
| TW | 201118938 | 6/2011 |
| TW | 201125373 | 7/2011 |
| TW | 201143474 | 12/2011 |
| TW | I356396 | 1/2012 |
| TW | 201240480 | 10/2012 |
| TW | 201240486 | 10/2012 |

* cited by examiner

THERMOACOUSTIC DEVICE

RELATED APPLICATIONS

This application claims all benefits accruing under 35 U.S.C. §119 from China Patent Application No. 201210471134.2, filed on Nov. 20, 2012 in the China Intellectual Property Office.

BACKGROUND

1. Technical Field

The present disclosure relates to a thermoacoustic device, especially a thermoacoustic device based on carbon nanotubes.

2. Description of Related Art

In traditional speakers, sounds are produced by mechanical movement of one or more diaphragms.

In one article, entitled "The thermophone as a precision source of sound" by H. D. Arnold and I. B. Crandall, Phys. Rev. 10, pp 22-38 (1917), a thermophone based on the thermoacoustic effect is disclosed. The thermophone in the article includes a platinum strip used as sound wave generator and two terminal clamps. The two terminal clamps are located apart from each other, and are electrically connected to the platinum strip. The platinum strip has a thickness of 0.7 micrometers. Frequency response range and sound pressure of sound wave are closely related to the heat capacity per unit area of the platinum strip. The higher the heat capacity per unit area, the narrower the frequency response range and the weaker the sound pressure. An extremely thin metal strip such as a platinum strip is difficult to produce. For example, the platinum strip has a heat capacity per unit area higher than $2 \times 10^{-4}$ J/cm$^2$*K. The highest frequency response of the platinum strip is only $4 \times 10^3$ Hz, and the sound pressure produced by the platinum strip is also too weak and is difficult to be heard by human.

In another article, entitled "Flexible, Stretchable, Transparent Carbon Nanotube Thin Film Loudspeakers" by Fan et al., Nano Letters, Vol. 8 (12), 4539-4545 (2008), a carbon nanotube speaker is disclosed. The carbon nanotube speaker includes a sound wave generator. The sound wave generator is a carbon nanotube film. The carbon nanotube speaker can produce a sound that can be heard because of a large specific surface area and small heat capacity per unit area of the carbon nanotube film. The frequency response range of the carbon nanotube speaker can range from about 100 Hz to about 100 KHz. However, carbon nanotube speakers are not convenient for use.

What is needed, therefore, is to provide a carbon nanotube speaker which is convenient for use.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

References will now be made to the drawings to describe, in detail, various embodiments of the thermoacoustic devices.

Figure 1:
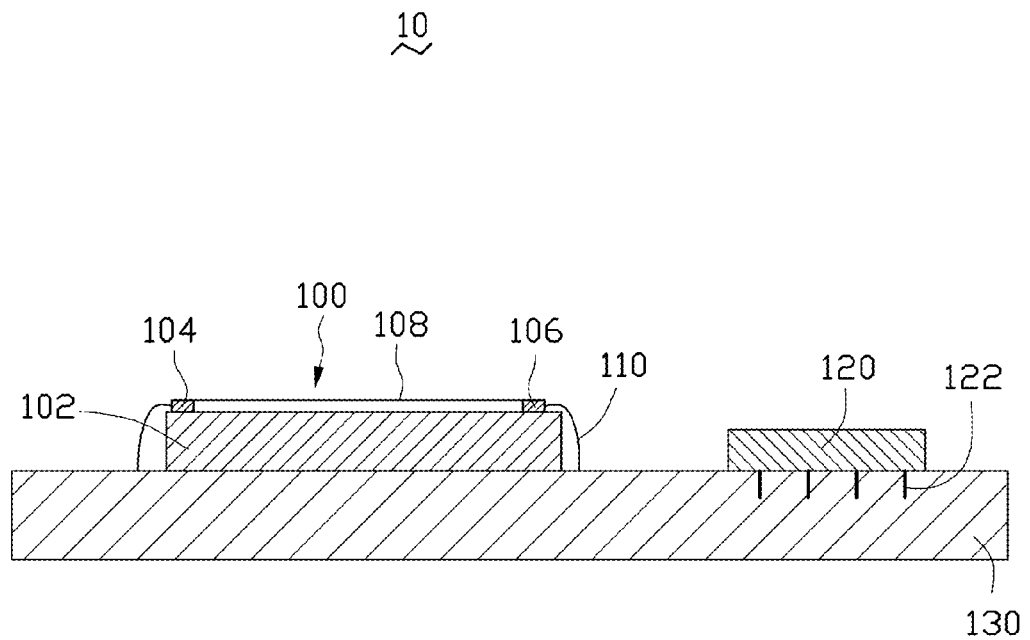
FIG. 1 is a schematic view of a first embodiment of a thermoacoustic device.

Referring to FIG. 1, a thermoacoustic device 10 of a first embodiment is shown. The thermoacoustic device 10 includes a speaker 100, an integrated circuit (IC) chip 120, and a printed circuit board (PCB) substrate 130. The speaker 100 and the IC chip 120 are installed on the PCB substrate 130 and electrically connected with each other through the PCB substrate 130.

The speaker 100 includes a substrate 102, a first electrode 104, a second electrode 106, and a sound wave generator 108. The substrate 102 has a first surface and a second surface opposite to the first surface. The first electrode 104 and the second electrode 106 are spaced from each other and electrically connected to the sound wave generator 108. If the substrate 102 is insulative, the first electrode 104 and the second electrode 106 can be located on the first surface of the substrate 102 directly. The first electrode 104 and the second electrode 106 are electrically connected to the pads (not shown) of the PCB substrate 130 by wires 110. The sound wave generator 108 can be in contact with the first surface of the substrate 102 or spaced from the first surface of the substrate 102 with the first electrode 104 and the second electrode 106. That is, part of the sound wave generator 108 is suspended by the first electrode 104 and the second electrode 106 and free of contact with any other surface. The speaker 100 can be fixed on the PCB substrate 130 by an adhesive, or installed on the PCB substrate 130 with a fastener.

The shape of the substrate 102 is not limited, such as round, square, or rectangle. The first surface and the second surface of the substrate 102 can be flat or curved. The size of the substrate 102 can be selected according to need. The area of the substrate 102 can be in a range from about 25 square millimeters to about 100 square millimeters, such as 40 square millimeters, 60 square millimeters, or 80 square millimeters. The thickness of the substrate 102 can be in a range from about 0.2 millimeters to about 0.8 millimeters. Thus, the speaker 100 can meet the demand for miniaturization of the electronic devices, such as mobile phones, computers, headsets or walkman. The material of the substrate 102 is not limited and can be made of flexible materials or rigid materials. In one embodiment, the resistance of the substrate 102 is greater than the resistance of the sound wave generator 108. When the sound wave generator 108 is in contact with the first surface of the substrate 102, the substrate 102 should be made of material with a certain heat-insulating property so that the heat produced by the sound wave generator 108 will not be absorbed by the substrate 102 too quickly. The material of the substrate 102 can be glass, ceramic, quartz, diamond, polymer, silicon oxide, metal oxide, or wood. In one embodiment, the substrate 102 is a square glass plate with a thickness of about 0.6 millimeters and a side length of about 0.8 millimeters. The first surface can be flat.

The sound wave generator 108 has a very small heat capacity per unit area. The heat capacity per unit area of the sound wave generator 108 is less than $2 \times 10^{-4}$ J/cm$^2$*K. The sound wave generator 108 can be a conductive structure with a small heat capacity per unit area and a small thickness. The sound wave generator 108 can have a large specific surface area for generating pressure oscillations in the surrounding medium by the temperature waves generated by the sound wave generator 108. The term "surrounding medium" means the medium outside of the sound wave generator 108, and does not include the medium inside the sound wave generator 108. If the sound wave generator 108 includes carbon nanotubes, the "surrounding medium" does not include the medium inside each carbon nanotube. The sound wave generator 108 can be a free-standing structure. The term "free-standing" includes, but is not limited to, a structure that does not have to be supported by a substrate and can sustain the weight of itself when it is hoisted by a portion thereof without any significant damage to its structural integrity. The suspended part of the sound wave generator 108 will have more sufficient contact with the surrounding medium (e.g., air) to have heat exchange with the surrounding medium from both sides of the sound wave generator 108. The sound wave generator 108 is a thermoacoustic film.

The sound wave generator 108 can be or include a free-standing carbon nanotube structure. The thickness of the carbon nanotube structure may range from about 0.5 nanometers to about 1 millimeter. If the thickness of the carbon nanotube structure is less than 10 micrometers, the carbon nanotube structure has good light transparency. The carbon nanotubes in the carbon nanotube structure are combined by van der Waals attractive force therebetween so that the carbon nanotube structure is free standing and can have at least a part be suspended. The carbon nanotube structure has a large specific surface area (e.g., above 30 m$^2$/g). The larger the specific surface area of the carbon nanotube structure, the smaller the heat capacity per unit area will be. The smaller the heat capacity per unit area, the higher the sound pressure level of the sound produced by the sound wave generator 108.

The carbon nanotube structure can include at least one carbon nanotube film, a plurality of carbon nanotube wires, or a combination of carbon nanotube film and the plurality of carbon nanotube wires. The carbon nanotube film can be a drawn carbon nanotube film formed by drawing a film from a carbon nanotube array that is capable of having a film drawn therefrom. The heat capacity per unit area of the drawn carbon nanotube film can be less than or equal to about $1.7 \times 10^{-6}$ J/cm$^2$*K. The drawn carbon nanotube film can have a large specific surface area (e.g., above 100 m$^2$/g). In one embodiment, the drawn carbon nanotube film has a specific surface area in the range of about 200 m$^2$/g to about 2600 m$^2$/g. In one embodiment, the drawn carbon nanotube film is a pure carbon nanotube structure consisting of a plurality of carbon nanotubes, and has a specific weight of about 0.05 g/m$^2$.

The thickness of the drawn carbon nanotube film can be in a range from about 0.5 nanometers to about 100 nanometers. If the thickness of the drawn carbon nanotube film is small enough (e.g., smaller than 10 μm), the drawn carbon nanotube film is substantially transparent.

Figure 2:
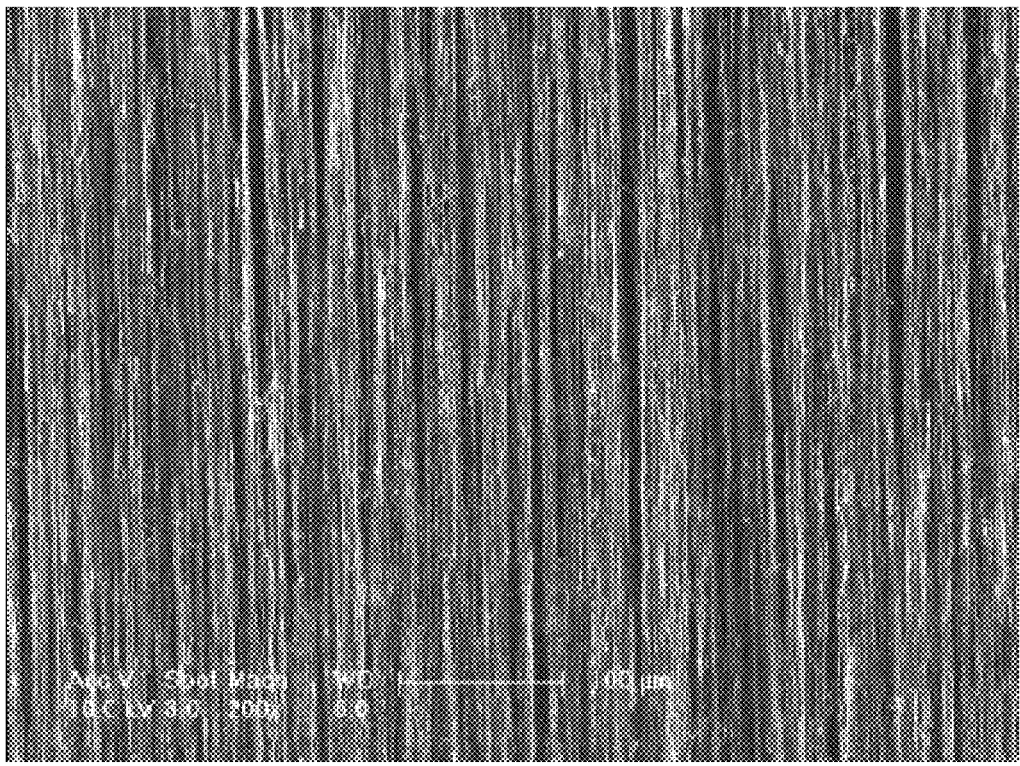
FIG. 2 is a Scanning Electron Microscope (SEM) image of a drawn carbon nanotube film.

Referring to FIG. 2, the drawn carbon nanotube film includes a plurality of successive and oriented carbon nanotubes joined end-to-end by van der Waals attractive force therebetween. The carbon nanotubes in the drawn carbon nanotube film can be substantially oriented along a single direction and substantially parallel to the surface of the carbon nanotube film. Furthermore, an angle β can exist between the oriented direction of the carbon nanotubes in the drawn carbon nanotube film and the extending direction of the plurality of grooves 1122, with 0≤β≤90°. As can be seen in FIG. 2, some variations can occur in the drawn carbon nanotube film. The drawn carbon nanotube film is a free-standing film. The drawn carbon nanotube film can be formed by drawing a film from a carbon nanotube array that is capable of having a carbon nanotube film drawn therefrom.

The carbon nanotube structure can include more than one carbon nanotube film. The carbon nanotube films in the carbon nanotube structure can be coplanar and/or stacked. Coplanar carbon nanotube films can also be stacked one upon other coplanar films. Additionally, an angle can exist between the orientation of carbon nanotubes in adjacent films, stacked and/or coplanar. Adjacent carbon nanotube films can be combined by only the van der Waals attractive force therebetween without the need of an additional adhesive. The number of the layers of the carbon nanotube films is not limited. However, as the stacked number of the carbon nanotube films increases, the specific surface area of the carbon nanotube structure will decrease. A large enough specific surface area (e.g., above 30 m$^2$/g) must be maintained to achieve an acceptable acoustic volume. An angle θ between the aligned directions of the carbon nanotubes in the two adjacent drawn carbon nanotube films can range from about 0 degrees to about 90 degrees. Spaces are defined between two adjacent carbon nanotubes in the drawn carbon nanotube film. If the angle θ between the aligned directions of the carbon nanotubes in adjacent drawn carbon nanotube films is larger than 0 degrees, a microporous structure is defined by the carbon nanotubes in the sound wave generator 108. The carbon nanotube structure in an embodiment employing these films will have a plurality of micropores. Stacking the carbon nanotube films will add to the structural integrity of the carbon nanotube structure.

In one embodiment, the sound wave generator 108 is a single drawn carbon nanotube film drawn from the carbon nanotube array and suspended by the first electrode 104 and the second electrode 106. The drawn carbon nanotube film can be attached on the first electrode 104 and the second electrode 106 by the inherent adhesive nature of the drawn carbon nanotube film or by a conductive bonder. The carbon nanotubes of the drawn carbon nanotube film substantially extend from the first electrode 104 to the second electrode 106. The drawn carbon nanotube film has a thickness of about 50 nanometers, and has a transmittance of visible light in a range from 67% to 95%.

Figure 3:
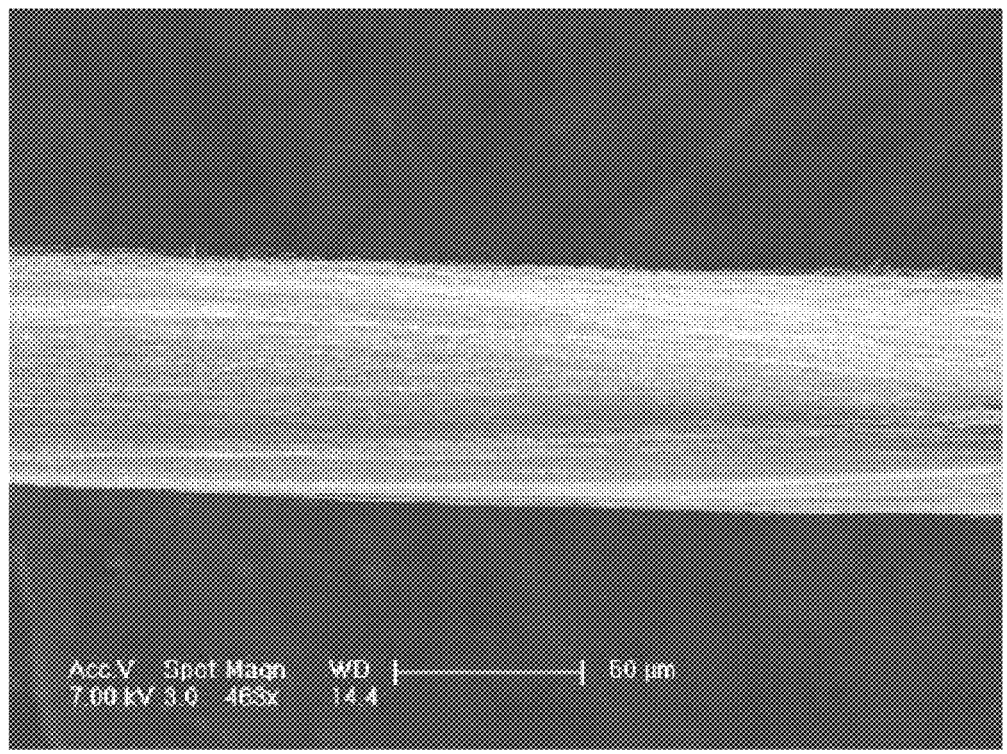
FIG. 3 an SEM image of an untwisted carbon nanotube wire.

The carbon nanotube wire can be untwisted or twisted. Treating the drawn carbon nanotube film with a volatile organic solvent can form the untwisted carbon nanotube wire. Specifically, the organic solvent, such as ethanol, methanol, acetone, ethylene dichloride, or chloroform is applied to soak the entire surface of the drawn carbon nanotube film. During the soaking, adjacent parallel carbon nanotubes in the drawn carbon nanotube film will bundle together, caused by the surface tension of the organic solvent as it volatilizes, and thus, the drawn carbon nanotube film will be shrunk into untwisted carbon nanotube wire. Referring to FIG. 3, the untwisted carbon nanotube wire includes a plurality of carbon nanotubes substantially oriented along one direction (i.e., a direction along the length of the untwisted carbon nanotube wire). The carbon nanotubes are substantially parallel to the axis of the untwisted carbon nanotube wire. More specifically, the untwisted carbon nanotube wire includes a plurality of successive carbon nanotube segments joined end to end by van der Waals attractive force therebetween. Each carbon nanotube segment includes a plurality of carbon nanotubes substantially parallel to each other, and combined by van der Waals attractive force therebetween. The carbon nanotube segments can vary in width, thickness, uniformity, and shape. Length of the untwisted carbon nanotube wire can be arbitrarily set as desired. A diameter of the untwisted carbon nanotube wire ranges from about 0.5 nm to about 100 µm.

Figure 4:
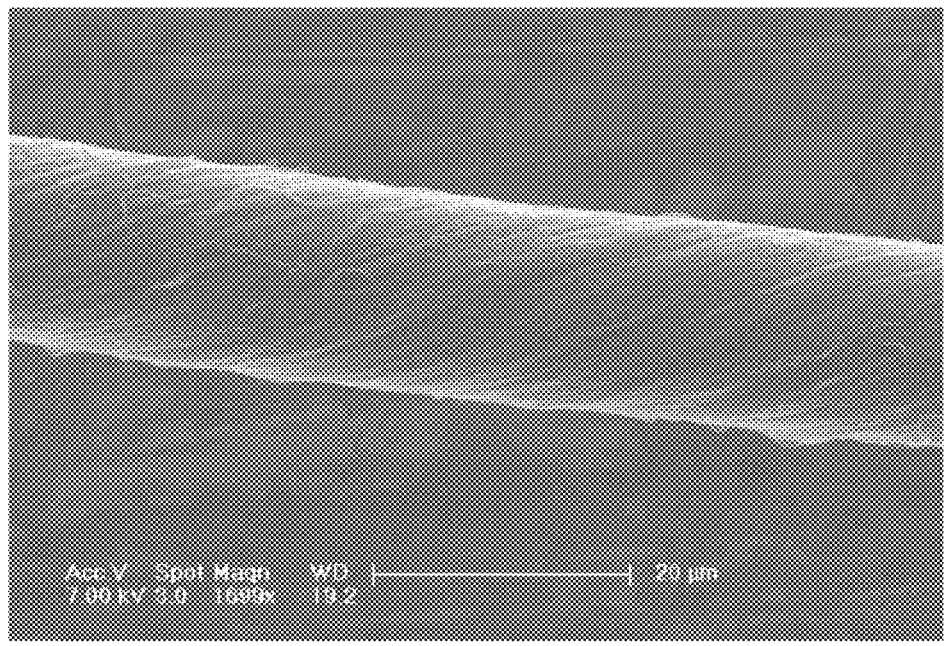
FIG. 4 is an SEM image of a twisted carbon nanotube wire.

The twisted carbon nanotube wire can be formed by twisting a drawn carbon nanotube film using a mechanical force to turn the two ends of the drawn carbon nanotube film in opposite directions. Referring to FIG. 4, the twisted carbon nanotube wire includes a plurality of carbon nanotubes helically oriented around an axial direction of the twisted carbon nanotube wire. More specifically, the twisted carbon nanotube wire includes a plurality of successive carbon nanotube segments joined end to end by van der Waals attractive force therebetween. Each carbon nanotube segment includes a plurality of carbon nanotubes substantially parallel to each other, and combined by van der Waals attractive force therebetween. A length of the carbon nanotube wire can be set as desired. A diameter of the twisted carbon nanotube wire can be from about 0.5 nm to about 100 µm. Further, the twisted carbon nanotube wire can be treated with a volatile organic solvent after being twisted. After being soaked by the organic solvent, the adjacent paralleled carbon nanotubes in the twisted carbon nanotube wire will bundle together, caused by the surface tension of the organic solvent when the organic solvent volatilizes. The specific surface area of the twisted carbon nanotube wire will decrease, while the density and strength of the twisted carbon nanotube wire will increase. The deformation of the sound wave generator 110 can be avoided during operation, and the degree of distortion of the sound wave can be reduced.

The first electrode 104 and the second electrode 106 are electrically connected to the sound wave generator 108 and used to input audio signal to the sound wave generator 108. The audio signal is inputted into the carbon nanotube structure through the first electrode 104 and the second electrode 106. The first electrode 104 and the second electrode 106 can be located on the first surface of the substrate 102 or on two supports (not shown) on the substrate 102. The first electrode 104 and the second electrode 106 are made of conductive material. The shape of the first electrode 104 or the second electrode 106 is not limited and can be lamellar, rod, wire, and block, among other shapes. A material of the first electrode 104 or the second electrode 106 can be metals, conductive paste, conductive adhesives, carbon nanotubes, and indium tin oxides, among other conductive materials. The first electrode 104 and the second electrode 106 can be metal wire or conductive material layers, such as metal layers formed by a sputtering method, or conductive paste layers formed by a method of screen-printing. In one embodiment, the first electrode 104 and the second electrode 106 are two substantially parallel conductive paste layers.

The IC chip 120 and the speaker 100 can be located on the same surface or different surface of the PCB substrate 130. The IC chip 120 can be fixed on the PCB substrate 130 with an adhesive, or installed on the PCB substrate 130 with a fastener. The IC chip 120 includes a power amplification circuit for amplifying audio signal and a direct current (DC) bias circuit. Thus, the IC chip 120 can amplify the audio signal and input the amplified audio signal to the sound wave generator 108. Simultaneously, the IC chip 120 can bias the DC electric signal. The shape and size of the IC chip 120 can be selected according to need. The internal structure of the IC chip 120 is simple because the IC chip 120 only plays the function of power amplification and DC bias. The area of the IC chip 120 is less than 1 square centimeter, such as 49 square millimeters, 25 square millimeters, or 9 square millimeters, to meet the demand for miniaturization of speaker 100. In one embodiment, the IC chip 120 is a packaged IC chip having a plurality of connectors 122, such as pins or pads. The IC chip 120 can be installed on the PCB substrate 130 with the plurality of connectors 122. The IC chip 120 is electrically connected to the first electrode 104 and the second electrode 106 via the conductive traces inside of the PCB substrate 130. In work of the thermoacoustic device 10, the IC chip 120 input an audio signal to the sound wave generator 108 of the speaker 10 and the sound wave generator 108 heats surrounding medium intermittently according to the input signal so that the surrounding medium to produce a sound by expansion and contraction.

The PCB substrate 130 is made of copper clad laminate. The PCB substrate 130 is used to install the IC chip 120 and the speaker 100, and electrically connect the IC chip 120 and the speaker 100 according to need. The PCB substrate 130 has a plurality of connectors (not shown) on surface and a plurality of conductive traces (not shown) inside. The plurality of connectors and the plurality of conductive traces are used to install and electrically connect the elements on the PCB substrate 130. The connectors can be directly integrated into the PCB substrate 130. The connectors can be pads, pins or holes. The size and shape of the PCB substrate 130 can be selected according to need.

In use, the thermoacoustic device 10 can be located inside of the electronic devices directly, such as mobile phones, computers, headsets or walkman, and electrically connected to the circuit of the electronic devices easily.

Figure 5:
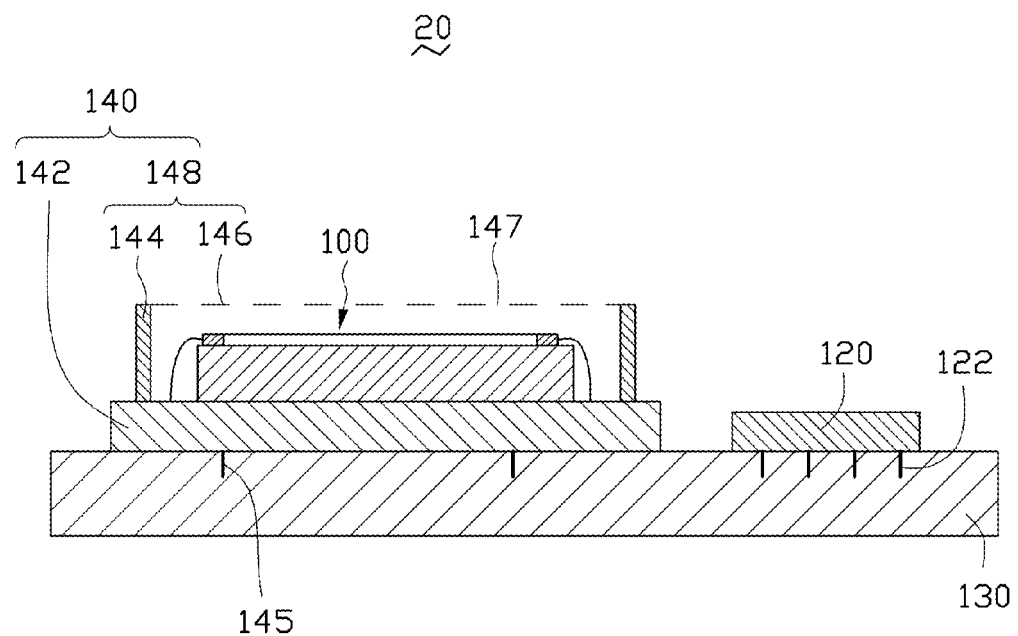
FIG. 5 is a schematic view of a second embodiment of a thermoacoustic device.

Referring to FIG. 5, a thermoacoustic device 20 of a second embodiment is shown. The thermoacoustic device 20 includes the speaker 100, the IC chip 120, the PCB substrate 130, and a shell 140. The speaker 100 and the IC chip 120 are installed on the PCB substrate 130 and electrically connected with each other through the PCB substrate 130.

The thermoacoustic device 20 is similar to the thermoacoustic device 10 above except that the speaker 100 is located in the shell 140. The shell 140 and the speaker 100 form a packaged thermoacoustic chip.

The shell 140 is used to accommodate and protect the speaker 100 so that the carbon nanotube structure would not be damaged because the strength of the carbon nanotube film is relatively low. The shape and size of the shell 140 is not limited. The shell 140 defines at lease one hole 147 allowing the sounds produced by the speaker 100 to transmit outside of the shell 140. In one embodiment, the shell 140 includes a planar plate 142 and a housing 148 located on a surface of the plate 142. The speaker 100 is located on the plate 142 and in the housing 148. The carbon nanotube structure sound wave generator 108 is located between the substrate 102 and the hole 147, and the sound wave generator 108 has a surface opposite to the hole 147.

The plate 142 can be a glass plate, a ceramic plate, a PCB plate, a polymer plate, or a wood plate. The plate 142 is used to support and fix the speaker 100. The shape and size of the plate 142 is not limited. The size of the plate 142 is greater than the size of the speaker 100. The area of the plate 142 can be in a range from about 36 square millimeters to about 150 square millimeters, such as 49 square millimeters, 64 square millimeters, 81 square millimeters, or 100 square millimeters. The thickness of the plate 142 can be in a range from about 0.5 millimeters to about 5 millimeters, such as 1 millimeter, 2 millimeters, 3 millimeters, or 4 millimeters. The housing 148 has a side wall 144 and a bottom wall 146 connected to the side wall 144. The side wall 144 is curved to form a hollow structure with a cross section in various shapes such as round, square, or rectangle. The bottom wall 146 defines a plurality of holes 147. The shape and size of the housing 148 can be selected according to need. The size of the housing 148 is a little greater than the size of the speaker 100. The housing 148 can be fixed on the plate 142 with an adhesive, or installed on the plate 142 with a fastener. The material of the housing 148 can be glass, ceramic, polymer, or metal. In one embodiment, the plate 142 is a polymer plate, and the housing 148 is a metal bucket with a plurality of holes 147 on the bottom wall. The housing 148 is spaced from the speaker 100.

The shell 140 can further includes two connectors 145 on the side wall 144 or plate 142. The two connectors 145 can be located on the same side or a different side of the shell 140. One of the two connectors 145 is electrically connected with the first electrode 104 and the other one is electrically connected with the second electrode 106. If the two connectors 145 are pins, the pins can be inserted into the holes of the PCB substrate 130 to electrically connect the speaker 100 with the IC chip 120. If the two connectors 145 are pads, the pads can be welded with the pads of the PCB substrate 130 to electrically connect the speaker 100 with the IC chip 120. In one embodiment, the two connectors 145 are located on the bottom surface of the plate 142 and electrically connected with the first electrode 104 and the second electrode 106 via wires 110.

Figure 6:
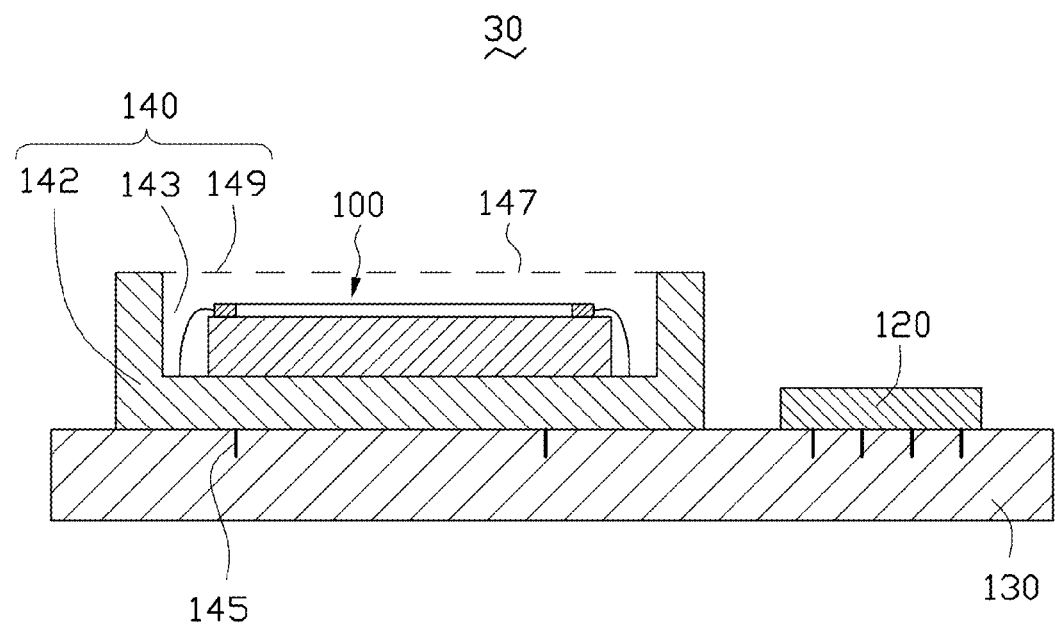
FIG. 6 is a schematic view of a third embodiment of a thermoacoustic device.

Referring to FIG. 6, a thermoacoustic device 30 of a third embodiment is shown. The thermoacoustic device 30 includes the speaker 100, the IC chip 120, the PCB substrate 130, and the shell 140. The speaker 100 and the IC chip 120 are installed on the PCB substrate 130 and electrically connected with each other through the PCB substrate 130.

The thermoacoustic device 30 is similar to the thermoacoustic device 20 above except that the shell 140 includes the plate 142 defining a recess 143 and a cover 149 covering the recess 143, and the speaker 100 is located in the recess 143.

The cover 149 can be a metal mesh, fiber net, or a metal plate with a plurality of through holes, a glass plate with a plurality of through holes, a polymer plate with a plurality of through holes, or a ceramic plate with a plurality of through holes. The recess 143 can be formed by punching, etching, or stamping. In one embodiment, the plate 142 is a polymer plate, and the cover 149 is a metal mesh and extends to suspend above the recess 143.

Figure 7:
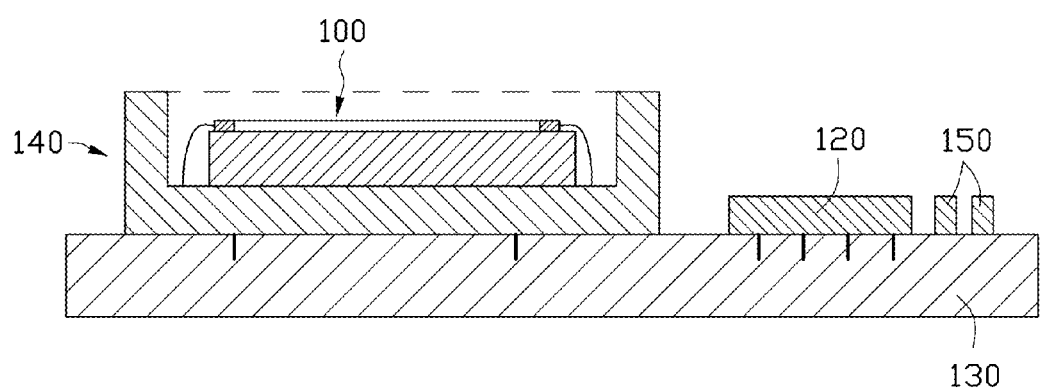
FIG. 7 is a schematic view of a fourth embodiment of a thermoacoustic device.

Referring to FIG. 7, a thermoacoustic device 40 of a fourth embodiment is shown. The thermoacoustic device 40 includes the speaker 100, the IC chip 120, the PCB substrate 130, and the shell 140. The speaker 100 and the IC chip 120 are installed on the PCB substrate 130 and electrically connected with each other through the PCB substrate 130.

The thermoacoustic device 40 is similar to the thermoacoustic device 30 above except that the thermoacoustic device 40 further includes one or more electric elements 150 installed on the PCB substrate 130. The electric elements 150 can be a capacitor, a resistor, or induction coil. The electric elements 150 are electrically connected with the IC chip 120 and work together with the IC chip 120.

Figure 8:
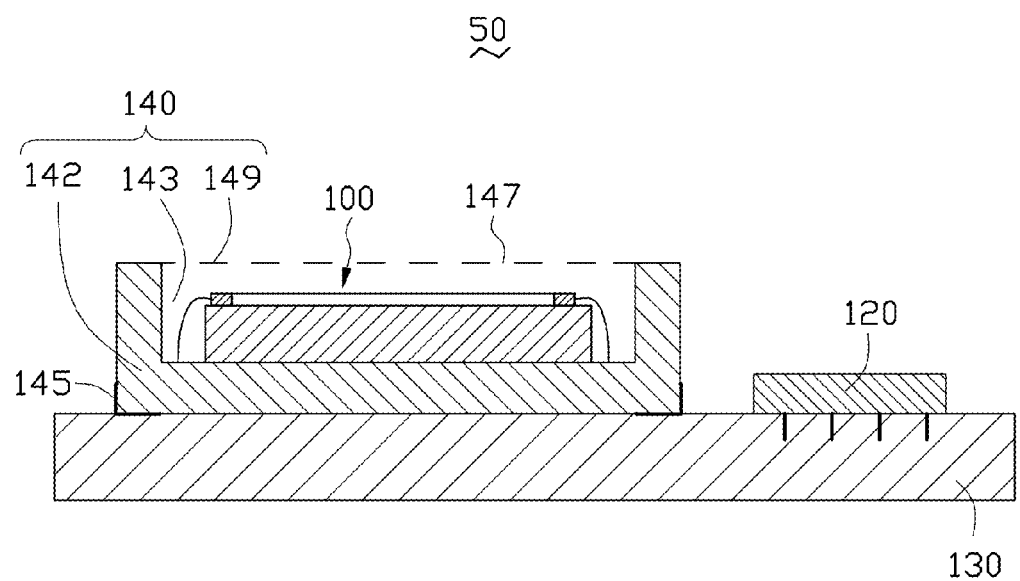
FIG. 8 is a schematic view of a fifth embodiment of a thermoacoustic device.

Referring to FIG. 8, a thermoacoustic device 50 of a fifth embodiment is shown. The thermoacoustic device 50 includes the speaker 100, the IC chip 120, the PCB substrate 130, and the shell 140. The speaker 100 and the IC chip 120 are installed on the PCB substrate 130 and electrically connected with each other through the PCB substrate 130.

The thermoacoustic device 50 is similar to the thermoacoustic device 30 above except that the connectors 145 are pads located on two corners of the plate 142. The two connectors 145 are welded with the pads of the PCB substrate 130.

Figure 9:
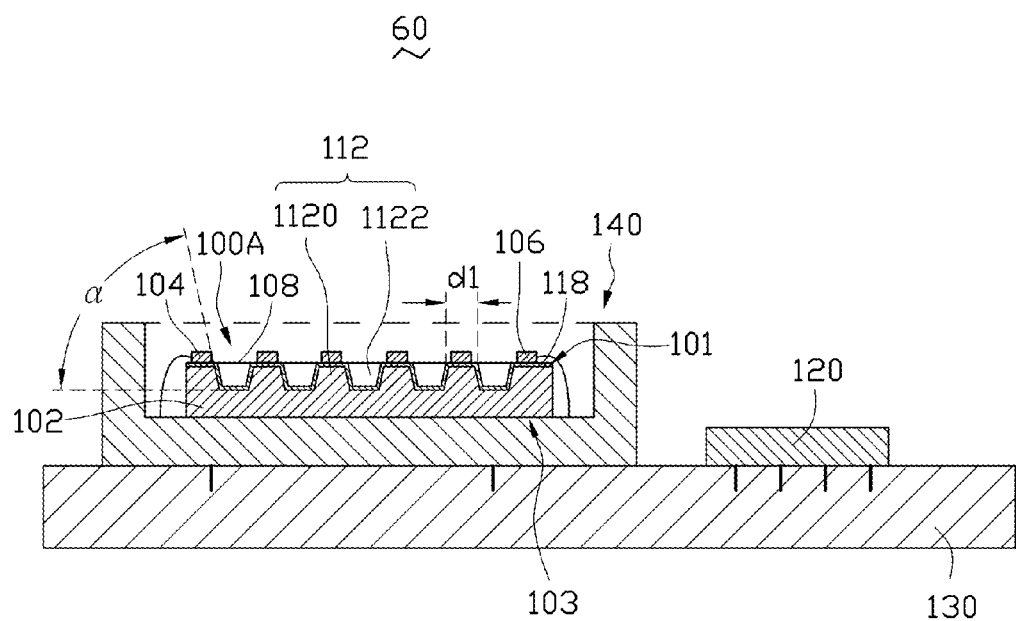
FIG. 9 is a schematic view of a sixth embodiment of a thermoacoustic device.
Figure 10:
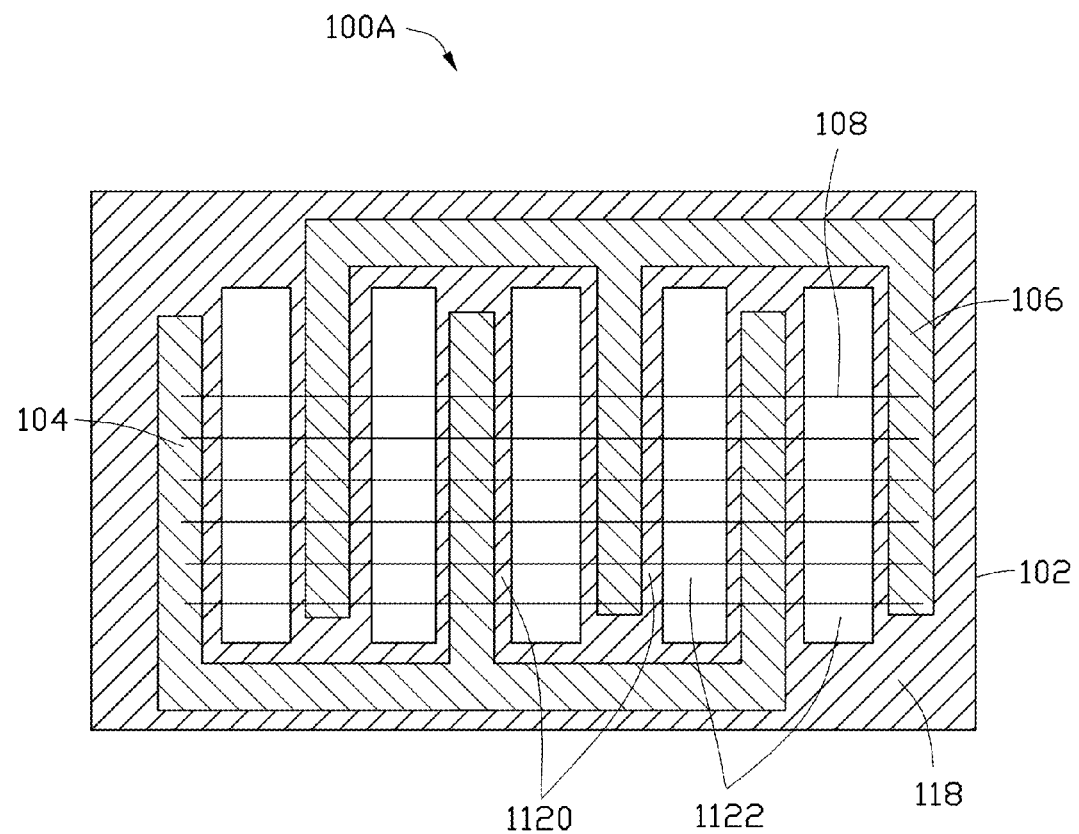
FIG. 10 is a top view of the thermoacoustic device of FIG. 9.

Referring to FIGS. 9-10, a thermoacoustic device 60 of a sixth embodiment is shown. The thermoacoustic device 60 includes the speaker 100A, the IC chip 120, the PCB substrate 130, and the shell 140. The speaker 100A and the IC chip 120 are installed on the PCB substrate 130 and electrically connected with each other through the PCB substrate 130.

The thermoacoustic device 60 is similar to the thermoacoustic device 30 above except that the substrate 102 of the speaker 100A has a concave-convex structure 112 on the first surface, and the sound wave generator 108 is suspended over the concave-convex structure 112. Further the speaker 100A includes a plurality of first electrodes 104 and a plurality of second electrodes 106.

Figure 11:
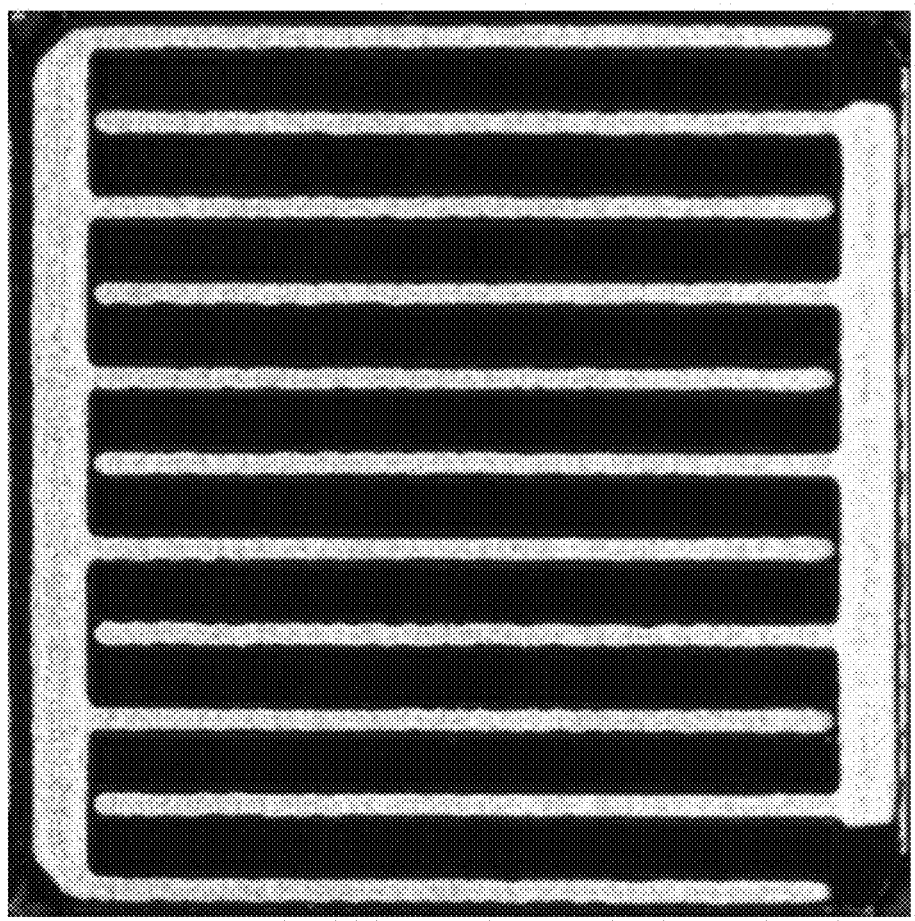
FIG. 11 is an SEM image of the sixth embodiment of the thermoacoustic device.

In one embodiment, the material of the substrate 102 can be monocrystalline silicon or polycrystalline silicon. The concave-convex structure 112 defines a plurality of grooves 1122 and a plurality of bulges 1120 alternately located. The carbon nanotube structure has a first portion located on the top surface of the plurality of bulges 1120 and a second portion suspended above the plurality of grooves 1122. The plurality of first electrodes 104 and the plurality of second electrodes 106 are alternately located on the top surface of the plurality of bulges 1120. The plurality of first electrodes 104 and the plurality of second electrodes 106 can be located between the carbon nanotube structure and the plurality of bulges 1120, or the carbon nanotube structure can be located between the plurality of bulges 1120 and the plurality of electrodes 104, 106. The plurality of first electrodes 104 are electrically connected with each other to form a comb-shaped first electrode, and the plurality of second electrodes 106 are electrically connected with each other to form a comb-shaped second electrode. As shown in FIG. 11, the teeth of the comb-shaped first electrode and the teeth of the comb-shaped second electrode are alternately located. Thus, the plurality of first electrodes 104, the plurality of second electrodes 106, and the sound wave generator 108 can form a plurality of thermoacoustic units electrically connected with each other in parallel, and the driving voltage of the sound wave generator 108 can be decreased.

The plurality of grooves 1122 can be substantially parallel with each other and extend substantially along the same direction. The length of the plurality of grooves 1122 can be smaller than or equal to the side length of the substrate 102. The depth of the plurality of grooves 1122 can be in a range from about 100 micrometers to about 200 micrometers. The range of depth, the sound wave generator 108 having a certain distance away from the bottom surface of the groove 1122, prevent the heat produced by the sound wave generator 108 from being absorbed by the substrate 102 too quickly, and simultaneously produce good sound at different frequencies. The cross section of each of the plurality of grooves 1122 along the extending direction can be V-shaped, rectangular, or trapezoid. The width (maximum span of the cross section) of each of the plurality of grooves 1122 can be in a range from about 0.2 millimeters to about 1 millimeter. The distance $d_1$ between adjacent grooves 1122 can range from about 20 micrometers to about 200 micrometers. Thus the first electrodes 104 and the second electrodes 106 can be printed on the plurality of bulges 1120 by screen printing. Thus sound wave generator 108 can be protected. Furthermore, a driven voltage of the sound wave generator 108 can be reduced to lower than 12V. In one embodiment, the driven voltage of the sound wave generator 108 is lower than or equal to 5V.

In one embodiment, the substrate 102 is a square monocrystalline silicon wafer with a side length of about 8 millimeters and a thickness of about 0.6 millimeters. The shape of the groove 1122 is a trapezoid. An angle α is defined between the sidewall and the bottom surface of the groove 1122, is equal to the crystal plane angle of the substrate 102. The width of the groove 1122 is about 0.6 millimeters, the depth of the groove 1122 is about 150 micrometers, the distance $d_1$ between adjacent grooves 1122 is about 100 micrometers, and the angle α is about 54.7 degrees.

Furthermore, an insulating layer 118 can be located on the first surface 101 of the substrate 102. The insulating layer 118 can be a single-layer structure or a multi-layer structure. In one embodiment, the insulating layer 118 can be merely located on the top surfaces of the plurality of bulges 1120. In another embodiment, the insulating layer 118 is a continuous structure, and attached on the entire first surface 101. That is, the insulating layer 118 is located on the top surfaces of the plurality of bulges 1120, and the side wall and bottom surface of the plurality of grooves 1122. The insulating layer 118 covers the plurality of grooves 1122 and the plurality of bulges 1120. The sound wave generator 108, the first electrode 104, and the second electrode 106 are insulated from the substrate 102 by the insulating layer 118. In one embodiment, the insulating layer 118 is a single-layer structure and covers the entire first surface 101. The material of the insulating layer 118 can be $SiO_2$, $Si_3N_4$, or a combination of them. The material of the insulating layer 118 can also be other insulating materials. The thickness of the insulating layer 118 can range from about 10 nanometers to about 2 micrometers, such as about 50 nanometers, about 90 nanometers, and about 1 micrometer. In one embodiment, the thickness of the insulating layer is a single $SiO_2$ layer with a thickness of about 1.2 micrometers.

In one embodiment, the sound wave generator 108 includes a plurality of carbon nanotube wires substantially parallel with and spaced from each other. The extending direction of the plurality of carbon nanotube wires and the extending direction of the plurality of grooves 1122 are substantially perpendicular with each other. Each of the plurality of carbon nanotube wire includes a plurality of carbon nanotubes substantially oriented along a direction along the length of the carbon nanotube wire. Part of the plurality of carbon nanotube wires are suspended over the plurality of grooves 1122. That is, the suspended parts of the plurality of carbon nanotube wires are free of contact with any other surface. The distance between adjacent carbon nanotube wires can be in a range from about 1 micrometer to about 200 micrometers. In one embodiment, the distance between adjacent carbon nanotube wires is in a range from about 50 micrometers to about 150 micrometers. In one embodiment, the distance between adjacent carbon nanotube wires is about 120 micrometers, and the diameter of the plurality of carbon nanotube wires is about 1 micrometer.

In one embodiment, the plurality of carbon nanotube wires can be made by the following steps:

step (10), laying a carbon nanotube film on the first electrode 104 and the second electrode 106, wherein the carbon nanotubes of the carbon nanotube film extend substantially along a direction perpendicular with the extending direction of the first electrode 104 and the second electrode 106;

step (12), forming a plurality of carbon nanotube belts in parallel with and spaced from each other by cutting the carbon nanotube film along the extending direction of the carbon nanotubes of the carbon nanotube film by a laser; and step (13), shrinking the plurality of carbon nanotube belts by treating with organic solvent, wherein the organic solvent can be dripped on the plurality of carbon nanotube belts.

In step (12), the width of the carbon nanotube belt is in a range from about 20 micrometers to about 50 micrometers so that the carbon nanotube belt can be shrunk into carbon nanotube wire completely. If the width of the carbon nanotube belt is too great, after the shrinking process, the carbon nanotube wire will have rips therebetween which will affect the sound produced by the carbon nanotube wire. If the width of the carbon nanotube belt is too small, the strength of the carbon nanotube wire will be too small which will affect the life span of the carbon nanotube wire.

Figure 12:
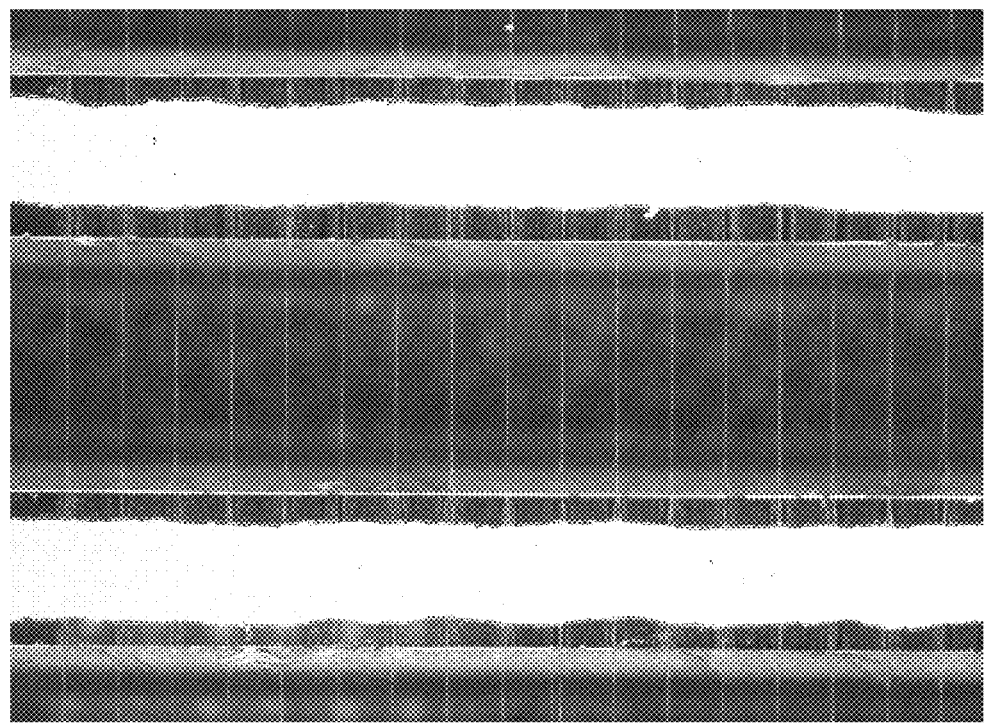
FIG. 12 is an optical microscope image of a plurality of carbon nanotube wires of the sixth embodiment of the thermoacoustic device.

In step (13), the plurality of carbon nanotube belts is shrunk to form the plurality of carbon nanotube wires (the dark portion is the substrate 102, and the white portions are the first electrode 104 and the second electrode 106) as shown in FIG. 12. The two opposite ends of the plurality of carbon nanotube wires are electrically connected to the first electrode 104 and the second electrode 106. The diameter of the carbon nanotube wires ranges from about 0.5 micrometers to about 3 micrometers. In one embodiment, the width of the carbon nanotube belt is about 30 micrometers, the diameter of the carbon nanotube wire is about 1 micrometer, and the distance between adjacent carbon nanotube wires is about 120 micrometers.

After treating the carbon nanotube belts, the driven voltage between the first electrode 104 and the second electrode 106 can be reduced. During the shrinking process, a part of the plurality of carbon nanotube belts attached on the plurality of bulges 1120 will not be shrunk by the organic solvent so that the plurality of carbon nanotube wires have a greater contact surface with the first electrode 104 and the second electrode 106. Thus after being shrunk, this part of the plurality of carbon nanotube wires can be firmly fixed on the bulges 104, and electrically connected to the first electrode 106 and the second electrode 116. Furthermore, after the shrinking process, the suspended part of the carbon nanotube wires are tightened and can prevent the sound produced by the carbon nanotube wire from being distorted.

Figure 13:
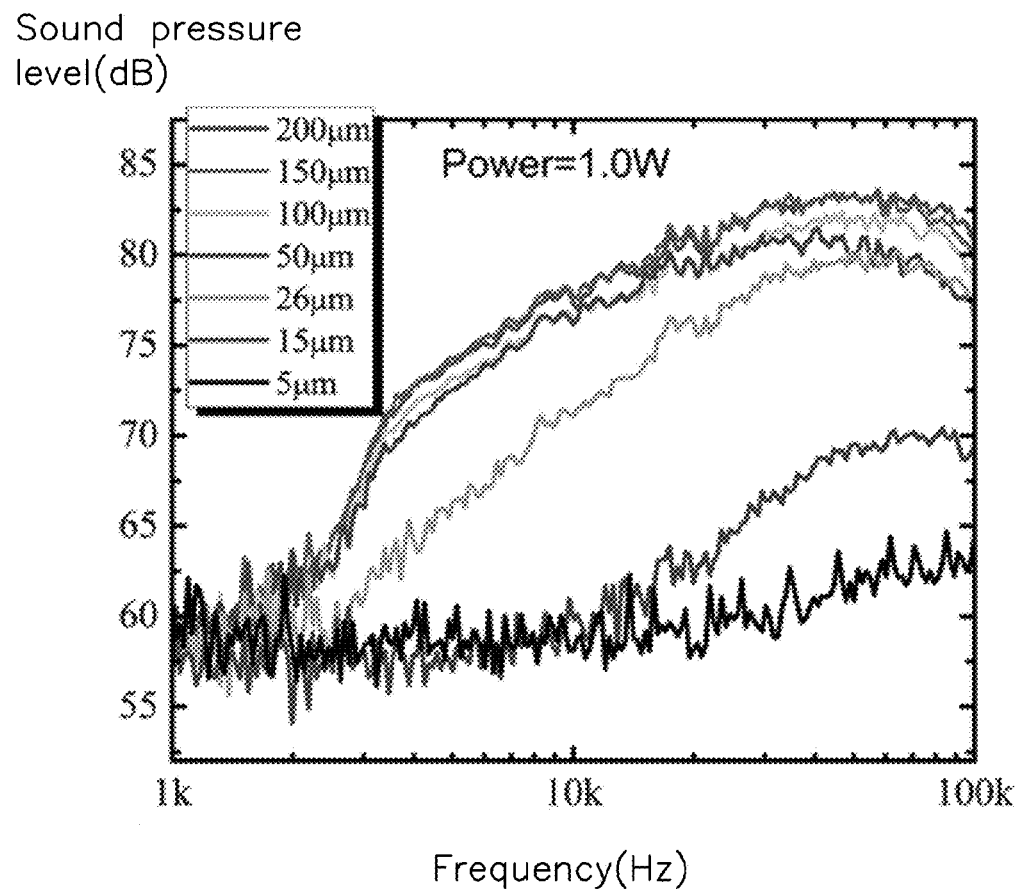
FIG. 13 shows a schematic view of the acoustic effect of the sixth embodiment of the thermoacoustic device.
Figure 14:
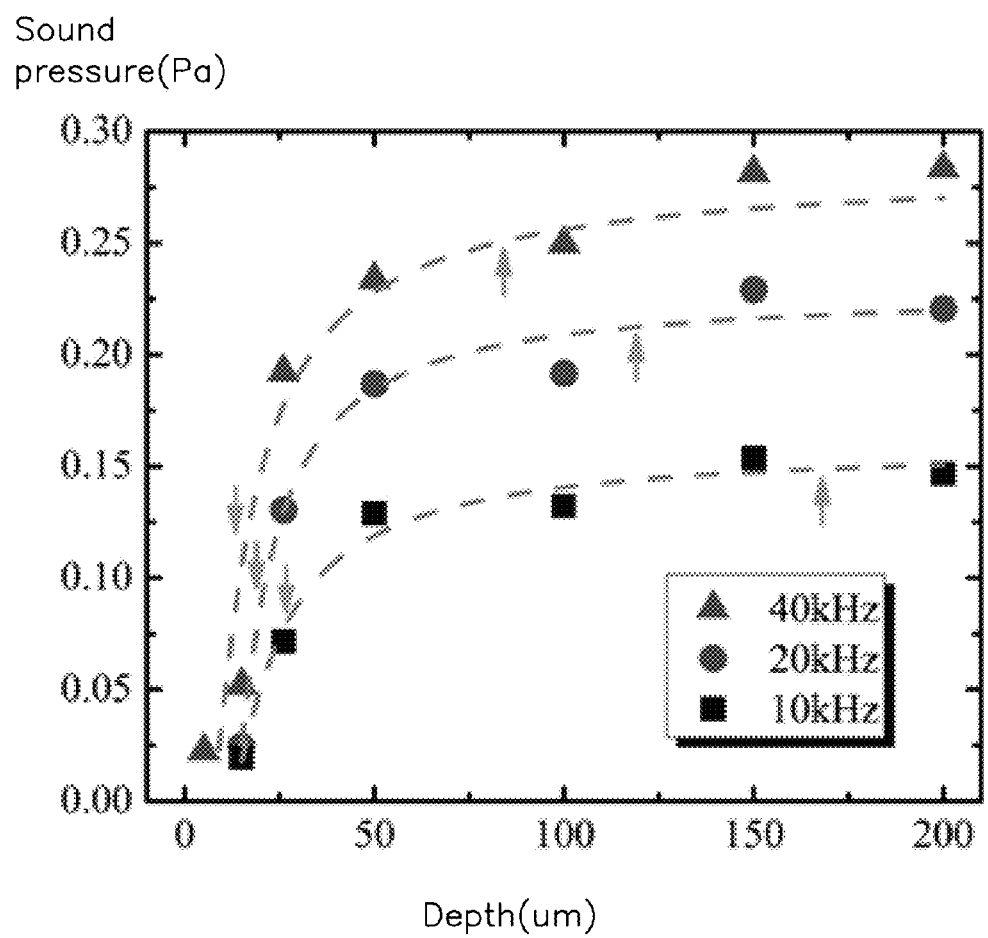
FIG. 14 shows a sound pressure level-frequency curve of the sixth embodiment of the thermoacoustic device.

Referring to FIGS. 13-14, the sound effect of the speaker 100A of the thermoacoustic device 60 is related to the depth of the plurality of grooves 1122. In one embodiment, the depth of the plurality of grooves 1122 ranges from about 100 micrometers to about 200 micrometers. Thus, in the frequency band for which the human can hear, the thermoacoustic device 60 have excellent thermal wavelength. Therefore, the thermoacoustic device 60 still has good sound depsite its small size.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

It is to be understood that the above-described embodiments are intended to illustrate rather than limit the disclosure. Variations may be made to the embodiments without departing from the spirit of the disclosure as claimed. The above-described embodiments illustrate the disclosure but do not restrict the scope of the disclosure.

What is claimed is:

1. A thermoacoustic device comprising:
a printed circuit board;
a thermoacoustic chip installed on the printed circuit board; and
an integrated circuit chip installed on the printed circuit board, wherein the thermoacoustic chip comprises a sound wave generator, and the thermoacoustic chip and the integrated circuit chip are electrically connected with each other through the printed circuit board;
wherein the thermoacoustic chip comprises a shell having a hole and a speaker located in the shell, and the speaker comprises:
a substrate having a surface, and the sound wave generator is located on the surface of the substrate and opposite to the hole of the shell;
a first electrode;
a second electrode, wherein the first electrode and the second electrode are spaced from each other and electrically connected to the sound wave generator; and
an insulating layer located on the surface of the substrate and sandwiched between the substrate and the sound wave generator so that the first electrode, the second electrode, and the sound wave generator are insulated from the substrate by the insulating layer.

2. The thermoacoustic device of claim 1, wherein the shell comprises a plate and a housing located on the plate, and the speaker is located on the plate and in the housing.

3. The thermoacoustic device of claim 2, wherein the housing comprises a side wall and a bottom wall connected to the side wall, and the bottom wall defines a plurality of holes.

4. The thermoacoustic device of claim 1, wherein the shell comprises a plate defining a recess and a cover covering the recess, and the speaker is located in the recess.

5. The thermoacoustic device of claim 4, wherein the cover is a metal mesh or a fiber net.

6. The thermoacoustic device of claim 1, wherein the sound wave generator is located between the substrate and the hole, and the sound wave generator has a surface opposite to the hole.

7. The thermoacoustic device of claim 1, wherein the shell further comprises two connectors electrically connected with the first electrode and the second electrode, and the thermoacoustic chip is attached on the printed circuit board through the two connectors.

8. The thermoacoustic device of claim 1, wherein the sound wave generator comprises a free-standing carbon nanotube structure, and a part of the carbon nanotube structure is suspended.

9. The thermoacoustic device of claim 8, wherein the carbon nanotube structure comprises a plurality of carbon nanotubes joined end-to-end and arranged substantially along a same direction.

10. The thermoacoustic device of claim 8, wherein the carbon nanotube structure comprises a plurality of carbon nanotube wires spaced from and in parallel with each other, and each of the plurality of carbon nanotube wires comprises a plurality of carbon nanotubes oriented substantially along a direction along a length of each of the plurality of carbon nanotube wires or helically oriented around an axial direction of each of the plurality of carbon nanotube wires.

11. The thermoacoustic device of claim 1, wherein the substrate is a silicon wafer and defining a concave-convex structure comprising a plurality of grooves and a plurality of bulges alternately located, and the sound wave generator has a first portion located on top surfaces of the plurality of bulges and a second portion suspended above the plurality of grooves.

12. The thermoacoustic device of claim 11, wherein a width of the each of the plurality of grooves is in a range from about 0.2 millimeters to about 1 millimeter.

13. The thermoacoustic device of claim 11, wherein a depth of each of the plurality of grooves is in a range from about 100 micrometers to about 200 micrometers.

14. The thermoacoustic device of claim 11, wherein the plurality of grooves are in parallel and spaced from each other, and a distance between adjacent two of the plurality of grooves is in a range from about 20 micrometers to about 200 micrometers.

15. The thermoacoustic device of claim 14, wherein the sound wave generator is a free-standing carbon nanotube structure comprising a plurality of carbon nanotubes extending substantially along a direction perpendicular with the plurality of grooves.

16. The thermoacoustic device of claim 11, wherein the speaker comprises a plurality of first electrodes and a plurality of second electrodes, the plurality of first electrodes and a plurality of second electrodes are located on the plurality of bulges and in parallel with the plurality of grooves.

17. The thermoacoustic device of claim 1, wherein the integrated circuit chip comprises a power amplification circuit and a direct current bias circuit.

18. A thermoacoustic device comprising:
a printed circuit board;
a speaker installed on the printed circuit board; and
an integrated circuit chip installed on the printed circuit board, wherein the speaker comprises a carbon nanotube sound wave generator, and the speaker and the integrated circuit chip are electrically connected with each other through the printed circuit board;
wherein the speaker further comprises:
a substrate having a surface, and the carbon nanotube sound wave generator is located on the surface of the substrate;
a first electrode;
a second electrode, wherein the first electrode and the second electrode are spaced from each other and electrically connected to the carbon nanotube sound wave generator; and
an insulating layer located on the surface of the substrate and sandwiched between the substrate and the carbon nanotube sound wave generator so that the first electrode, the second electrode, and the carbon nanotube sound wave generator are insulated from the substrate by the insulating layer.

* * * * *